(12) United States Patent
Subramanian et al.

(10) Patent No.: US 11,579,602 B2
(45) Date of Patent: Feb. 14, 2023

(54) METHOD FOR COMMISSIONING AND MAINTENANCE OF ALARM SYSTEMS

(71) Applicant: CARRIER CORPORATION, Palm Beach Gardens, FL (US)

(72) Inventors: Sabarigirinathan Subramanian, Telangana (IN); Don Patric Lobo, Telangana (IN); Venkata Narasimha Rao Chavala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/734,452

(22) PCT Filed: Dec. 10, 2019

(86) PCT No.: PCT/US2019/065324
§ 371 (c)(1),
(2) Date: Dec. 2, 2020

(87) PCT Pub. No.: WO2020/123417
PCT Pub. Date: Jun. 18, 2020

(65) Prior Publication Data
US 2021/0365021 A1    Nov. 25, 2021

(30) Foreign Application Priority Data
Dec. 13, 2018  (IN) .............................. 201811047204

(51) Int. Cl.
*G05B 23/02* (2006.01)
*G08B 29/06* (2006.01)

(52) U.S. Cl.
CPC ....... *G05B 23/0275* (2013.01); *G05B 23/027* (2013.01); *G08B 29/06* (2013.01)

(58) Field of Classification Search
None
See application file for complete search history.

(56) References Cited

U.S. PATENT DOCUMENTS 6,624,750 B1  9/2003  Marman et al.
6,737,967 B2  5/2004  Farley
(Continued)

FOREIGN PATENT DOCUMENTS

EP    2843636 A1    4/2015
EP    2988282 A1    2/2016
(Continued)

OTHER PUBLICATIONS

"GEMC-FW-SLC Fire Signaling Line Circuit Module, Installation Instructions", NAPCO, 2010. (Year: 2010).*
International Search Report for International Application No. PCT/US2019/065324, International Filing Date Dec. 10, 2019, dated Jun. 26, 2020, 7 pages.
(Continued)

*Primary Examiner* — Carlos R Ortiz Rodriguez
(74) *Attorney, Agent, or Firm* — Cantor Colburn LLP

(57) ABSTRACT

A method of commissioning or maintenance an alarm system is provided. The method including: receiving a fault report including one or more faults from an alarm system; categorizing the one or more faults; prioritizing the one or more faults into a list of highest priority; determining a first root cause of a first fault of the one or more faults in response to at least one of an alarm system configuration of the alarm system, a device mapping of the alarm system, and an event history of the alarm system; providing instructions, via a user interface, regarding how to resolve the first fault in response to the first root cause; and detecting whether the first fault is resolved.

18 Claims, 4 Drawing Sheets

(56) References Cited

U.S. PATENT DOCUMENTS

| | | |
|---|---|---|
| 6,960,987 B2 | 11/2005 | Dohi et al. |
| 7,042,349 B2 | 5/2006 | Bergman et al. |
| 7,242,288 B2 | 7/2007 | Kaiser et al. |
| 7,504,937 B2 | 3/2009 | McKenna et al. |
| 7,649,450 B2 | 1/2010 | Campion et al. |
| 7,786,854 B2 | 3/2010 | Hosey |
| 7,710,256 B2 | 5/2010 | Tawil |
| 7,746,222 B2 | 6/2010 | Kogan et al. |
| 8,228,182 B2 | 7/2012 | Orsini et al. |
| 8,289,161 B2 | 10/2012 | Hosey |
| 8,553,664 B2 | 10/2013 | Bansal et al. |
| 8,810,387 B2 | 8/2014 | Hall et al. |
| 8,994,525 B2 | 3/2015 | Piccolo, III et al. |
| 9,015,020 B2 | 4/2015 | Lontka |
| 9,030,314 B2 | 5/2015 | Piccolo, III et al. |
| 9,076,313 B2 | 7/2015 | Piccolo et al. |
| 9,390,616 B2 | 7/2016 | Breed et al. |
| 9,552,720 B2 | 1/2017 | Moffa |
| 9,619,125 B2 | 4/2017 | Ruszala |
| 9,767,679 B2 | 9/2017 | Piccolo et al. |
| 9,818,276 B2 | 11/2017 | Tian et al. |
| 9,905,115 B2 | 2/2018 | Venkatesh et al. |
| 2003/0210138 A1 | 11/2003 | Farley |
| 2007/0194907 A1 | 8/2007 | Tawil |
| 2008/0030319 A1 | 2/2008 | McKenna et al. |
| 2008/0084291 A1 | 4/2008 | Campion et al. |
| 2009/0184816 A1 | 7/2009 | Hosey |
| 2010/0315224 A1 | 12/2010 | Orisini et al. |
| 2013/0106600 A1 | 5/2013 | Hall et al. |
| 2015/0097664 A1 | 4/2015 | Breed et al. |
| 2015/0142898 A1 | 5/2015 | Piccolo, III |
| 2015/0206421 A1 | 7/2015 | Moffa |
| 2016/0093203 A1 | 3/2016 | Hamilton et al. |
| 2016/0225251 A1 | 8/2016 | Di Marco et al. |
| 2016/0300475 A1* | 10/2016 | Childs .................. G08B 25/00 |
| 2017/0004693 A1 | 1/2017 | Tian et al. |
| 2017/0104823 A1 | 4/2017 | Capps |
| 2017/0287319 A1 | 10/2017 | Moffa |
| 2018/0005513 A1 | 1/2018 | Venkatesh et al. |
| 2018/0011461 A1 | 1/2018 | Camarasa et al. |
| 2018/0061217 A1 | 3/2018 | Eichler |
| 2018/0075733 A1 | 3/2018 | Brown et al. |

FOREIGN PATENT DOCUMENTS

| | | |
|---|---|---|
| WO | 2008031193 A1 | 3/2008 |
| WO | 2016164701 A1 | 10/2016 |

OTHER PUBLICATIONS

Written Opinion for International Application No. PCT/US2019/065324, International Filing Date Dec. 10, 2019, dated Jun. 26, 2020, 12 pages.

* cited by examiner

METHOD FOR COMMISSIONING AND MAINTENANCE OF ALARM SYSTEMS

CROSS REFERENCE TO RELATED APPLICATIONS

This application is a National Stage application of PCT/US2019/065324, filed Dec. 10, 2019, which claims the benefit of India Application No. 201811047204, filed Dec. 13, 2018, both of which are incorporated by reference in their entirety herein.

BACKGROUND

The subject matter disclosed herein generally relates to the field of alarm systems, and more particularly to an apparatus and method for commissioning and maintenance of alarm systems.

When an alarm system or a component of a system is installed or commissioned, there is generally a testing process that the alarm system undergoes. Testing may also take place in other situations. The testing can include testing of operability (to determine if the alarm system is operational). It would be desirable to be able to shorten this process.

BRIEF SUMMARY

According to one embodiment, a method of commissioning or maintenance an alarm system is provided. The method including: receiving a fault report comprising one or more faults from an alarm system; categorizing the one or more faults; prioritizing the one or more faults into a list of highest priority; determining a first root cause of a first fault of the one or more faults in response to at least one of an alarm system configuration of the alarm system, a device mapping of the alarm system, and an event history of the alarm system; providing instructions, via a user interface, regarding how to resolve the first fault in response to the first root cause; and detecting whether the first fault is resolved.

In addition to one or more of the features described above, or as an alternative, further embodiments may include: determining a second root cause of a first fault of the one or more faults in response to at least one of an alarm system configuration of the alarm system, a device mapping of the alarm system, and an event history of the alarm system, when the first fault is not resolved; providing instructions regarding how to resolve the first fault in response to the second root cause; and detecting whether the first fault is resolved.

In addition to one or more of the features described above, or as an alternative, further embodiments may include: determining that the first fault is resolved; determining that a second fault of the one or more faults is unresolved; determining a first root cause of a second fault of the one or more faults in response to at least one of an alarm system configuration of the alarm system, a device mapping of the alarm system, and an event history of the alarm system; providing instructions regarding how to resolve the second fault in response to the first root cause of the second fault; and detecting whether the second fault is resolved.

In addition to one or more of the features described above, or as an alternative, further embodiments may include that the first fault is prioritized higher than the second fault.

In addition to one or more of the features described above, or as an alternative, further embodiments may include: determining a second root cause of a second fault of the one or more faults in response to at least one of an alarm system configuration of the alarm system, a device mapping of the alarm system, and an event history of the alarm system, when the second fault is not resolved; providing instructions regarding how to resolve the second fault in response to the second root cause; and detecting whether the second fault is resolved.

In addition to one or more of the features described above, or as an alternative, further embodiments may include that the instructions are provided through at least one of a control panel of the alarm system and a mobile computing device in communication with the control panel.

According to another embodiment, a method of commissioning an alarm system is provided. The method including: receiving a fault report comprising one or more faults from an alarm system; categorizing the one or more faults into groups including a device communication failure group, wherein each of the one or more faults in the device communication failure group is a device communication failure fault; organizing the one or more faults in the device communication failure group into one or more signaling line circuits of the alarm system, the one or more signaling line circuits including a first signaling line circuit; and providing instructions, via a user interface, regarding how to resolve the one or more faults along the first signaling line circuit in the device communication failure group.

In addition to one or more of the features described above, or as an alternative, further embodiments may include that providing instructions further comprises: determining whether each device in the first signaling line circuit is present in an alarm system configuration of the alarm system; and conveying that a device in the first signaling line circuit should be added to the alarm system configuration of the alarm system if determined to not be present.

In addition to one or more of the features described above, or as an alternative, further embodiments may include that providing instructions further comprises: determining whether each device in the first signaling line circuit has communicated with a control panel of the alarm system previously based upon an event history of the control panel; and conveying that a device in the first signaling line circuit should be connected to the control panel if determined to have not communicated with the control panel.

In addition to one or more of the features described above, or as an alternative, further embodiments may include that providing instructions further comprises: determining whether each device in the first signaling line circuit has communicated with a control panel of the alarm system previously based upon an event history of the control panel; and conveying that a device in the first signaling line circuit should be connected to the control panel if determined to have not communicated with the control panel.

In addition to one or more of the features described above, or as an alternative, further embodiments may include that providing instructions further comprises: determining a list of all devices in the first signaling line circuit having a fault indicating a communication failure; comparing a device mapping of the alarm system to the list of all devices in the first signaling line circuit having a fault indicating a communication failure; determining a device closest to the control panel indicating a communication failure; and conveying that the device closest to the control panel is indicating a communication failure and should be checked first.

In addition to one or more of the features described above, or as an alternative, further embodiments may include that providing instructions further comprises: determining a list of all devices in the first signaling line circuit having a fault indicating a communication failure; comparing a device mapping of the alarm system to the list of all devices in the first signaling line circuit having a fault indicating a communication failure; determining a device closest to the control panel indicating a communication failure; and conveying that the device closest to the control panel is indicating a communication failure and should be checked first.

In addition to one or more of the features described above, or as an alternative, further embodiments may include that the instructions are provided through at least one of a control panel of the alarm system and a mobile computing device in communication with the control panel.

According to another embodiment, a computer program product tangibly embodied on a computer readable medium is provided. The computer program product including instructions that, when executed by a processor, cause the processor to perform operations including: receiving a fault report comprising one or more faults from an alarm system; categorizing the one or more faults; prioritizing the one or more faults into a list of highest priority; determining a first root cause of a first fault of the one or more faults in response to at least one of an alarm system configuration of the alarm system, a device mapping of the alarm system, and an event history of the alarm system; providing instructions, via a user interface, regarding how to resolve the first fault in response to the first root cause; and detecting whether the first fault is resolved.

In addition to one or more of the features described above, or as an alternative, further embodiments may include that the operations further comprise: determining a second root cause of a first fault of the one or more faults in response to at least one of an alarm system configuration of the alarm system, a device mapping of the alarm system, and an event history of the alarm system, when the first fault is not resolved; providing instructions regarding how to resolve the first fault in response to the second root cause; and detecting whether the first fault is resolved.

In addition to one or more of the features described above, or as an alternative, further embodiments may include that the operations further comprise: determining that the first fault is resolved; determining that a second fault of the one or more faults is unresolved; determining a first root cause of a second fault of the one or more faults in response to at least one of an alarm system configuration of the alarm system, a device mapping of the alarm system, and an event history of the alarm system; providing instructions regarding how to resolve the second fault in response to the first root cause of the second fault; and detecting whether the second fault is resolved.

In addition to one or more of the features described above, or as an alternative, further embodiments may include that the first fault is prioritized higher than the second fault.

In addition to one or more of the features described above, or as an alternative, further embodiments may include that the operations further comprise: determining a second root cause of a second fault of the one or more faults in response to at least one of an alarm system configuration of the alarm system, a device mapping of the alarm system, and an event history of the alarm system, when the second fault is not resolved; providing instructions regarding how to resolve the second fault in response to the second root cause; and detecting whether the second fault is resolved.

In addition to one or more of the features described above, or as an alternative, further embodiments may include that the instructions are provided through at least one of a control panel of the alarm system and a mobile computing device in communication with the control panel.

Technical effects of embodiments of the present disclosure include commissioning an alarm system semi-autonomously through a series of checks for the technician based upon the type of alarm system and configuration of the alarm system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

It should be noted that, although aspects are discussed in conjunction with an alarm system, embodiments can be used with any type of alarm system, including but not limited to a fire alarm system, a smoke alarm system, an indoor environmental quality (IEQ) system, an building intrusion monitoring system, a home automation system, or any other alarm system known to one of skill in the art. An IEQ system includes measurements of levels of particulates in the air, such as the level of carbon monoxide, carbon dioxide, temperature, humidity, ozone, and the like.

Figure 1:
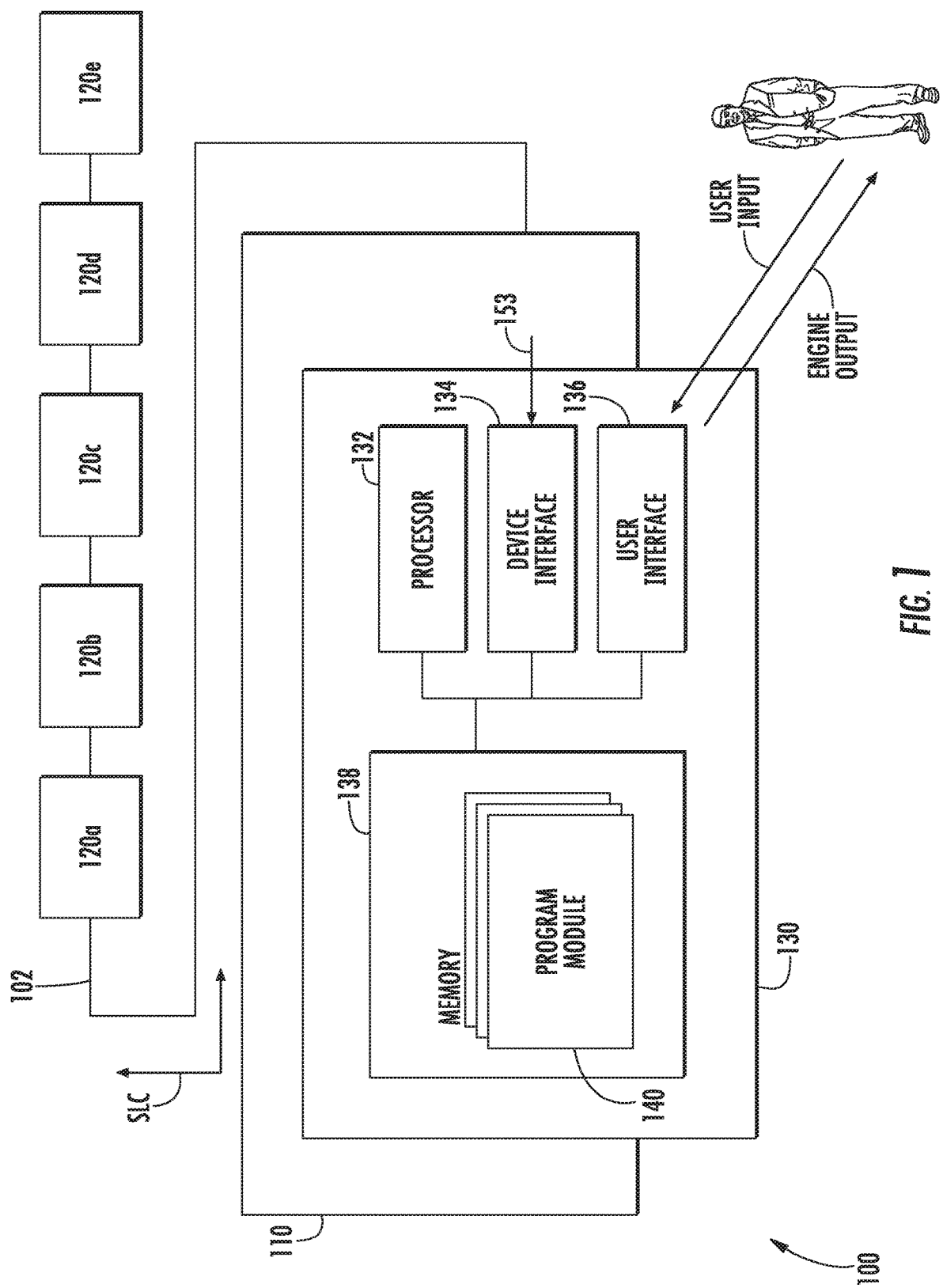
FIG. 1 illustrates a general schematic system diagram of an alarm system, in accordance with an embodiment of the disclosure.

A block diagram illustrating an alarm system 100 is presented in FIG. 1. Alarm system 100 includes a control panel 110, a plurality of devices 120a-120e, and a commissioning engine 130. The devices 120a-120e form a loop of devices in that control panel 110 is coupled to device 120a and subsequently to devices 120b-120e through a signaling line circuit (SLC) 120a such that each device 120a-120e in the loop is in communication with the control panel 110 (i.e., each device 120a-120e in the loop is communicatively coupled to the control panel 110).

Each device 120a-120e is connected in series to the control panel 110 through the SLC 102 in such a way that device 120b is coupled to device 120a and device 120c, device 120c is coupled to device 120b and device 120d, and device 120d is coupled to devices 120c and device 120e. In one embodiment, the SLC 102 that provides the coupling between devices 120a-120e is in the form of a low-power circuit. A low amount of voltage (on the order of 12 to 42 volts) may be supplied by control panel 110 to each of devices 120a-120e through the SLC 102. While only five devices 120a-120e are shown in FIG. 1, it should be understood that any number of devices 120a-120e that can be supported by the control panel 110 may be present in the alarm system 100. While a wired connection is described above, it should be understood that a wireless connection between devices 120a-120e also may be used, in addition to a combination of wired devices and wireless devices; where wireless connection is used voltage may be supplied from a source such as a battery or hard-wiring to an external power source.

The devices 120a-120e may be one of a variety of different devices that are typically used in an alarm system, fire alarm system, a smoke alarm system, an IEQ system, an building intrusion monitoring system, a home automation system, or any other alarm system being tested, such as, for example audible alert devices, visual alert devices, detectors, alarm activation devices, motion sensors, occupancy detection sensors, break glass sensors, door/window lock sensors, audio inputs, video inputs, etc. Audible alert devices may include but are not limited to sirens, bells, horns, and other audible alarm devices known to one of skill in the art. Visual alert devices may include but are not limited to strobe lighting, emergency lighting, including signage, spotlights, and other visual alert devices known to one of skill in the art. Detectors may include but are not limited to smoke detectors, heat detectors, carbon monoxide detectors, natural gas detectors, a combination detector including two or more different detectors and other detectors known to one of skill in the art. Alarm activation devices may include but are not limited to pull stations, alarm buttons, and other detectors known to one of skill in the art.

The alarm system 100 may have a single SLC 102. However, depending upon a size of a building housing the alarm system 100, multiple SLCs 102 may be connected to a single control panel 110. There may also be multiple alarm systems 100 systems per building, which may be coupled together by coupling the controls panels 110 of each alarm system 100.

As shown in FIG. 1, the commissioning engine 130 is implemented as a controller having a processor 132, a device interface 134, a user interface 136 and a memory 138. The processor 132 is disposed in communication with the device interface 134, and user interface 136 and the memory 138. The processor 132 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. In certain embodiments the user interface 136 and/or the commissioning engine 130 can be located at the control panel 110 of the alarm system 100. In accordance with certain embodiments the user interface 136 can located at a mobile computing device in communication with the control panel 110.

The device interface 134 provides the control panel 110 and/or the commissioning engine 130 with device receiving capabilities and transmitting capabilities. In this respect the device interface 134 is disposed in communication with the processor 132 and devices 120a-120e via the control panel 110 to receive a fault report 153 including one or more faults 154. The receiving and transmitting capabilities provided by the device interface 134 may use any form of wired or wireless communication. In certain embodiments the commissioning engine 130 may include a mobile computing device.

The user interface 136 provides the control panel 110 and/or the commissioning engine 130 with user input receiving capabilities and engine output transmitting capabilities for user interaction. In this respect the user interface 136 is disposed in communication with the processor 132 and is operatively associated therewith for receiving user input and transmitting engine output to the user. The receiving and transmitting capabilities may use any form of communication, e.g., visible, audible, and/or data communication.

The memory 138 includes a non-transitory machine-readable medium having a plurality of program modules 140 recorded on it. The non-transitory machine-readable medium of the memory 138 may be a storage device such as, for example, a random access memory (RAM), read only memory (ROM), or other electronic, optical, magnetic or any other computer readable medium. The plurality of program modules 140 include instructions that, when read by the processor 132, cause the processor to undertake certain actions. Among those actions are operations of a method 200 (shown in FIG. 3) and a method 300 (shown in FIG. 4) of commissioning or maintenance of the alarm system 100, as will be described. Among those actions are operations performed by an intelligent algorithm 152 (shown in FIG. 2), as will also be described.

When an alarm system 100 is installed in a building, the alarm system 100 must go through a commissioning process performed by a site engineer 10.

Figure 2:
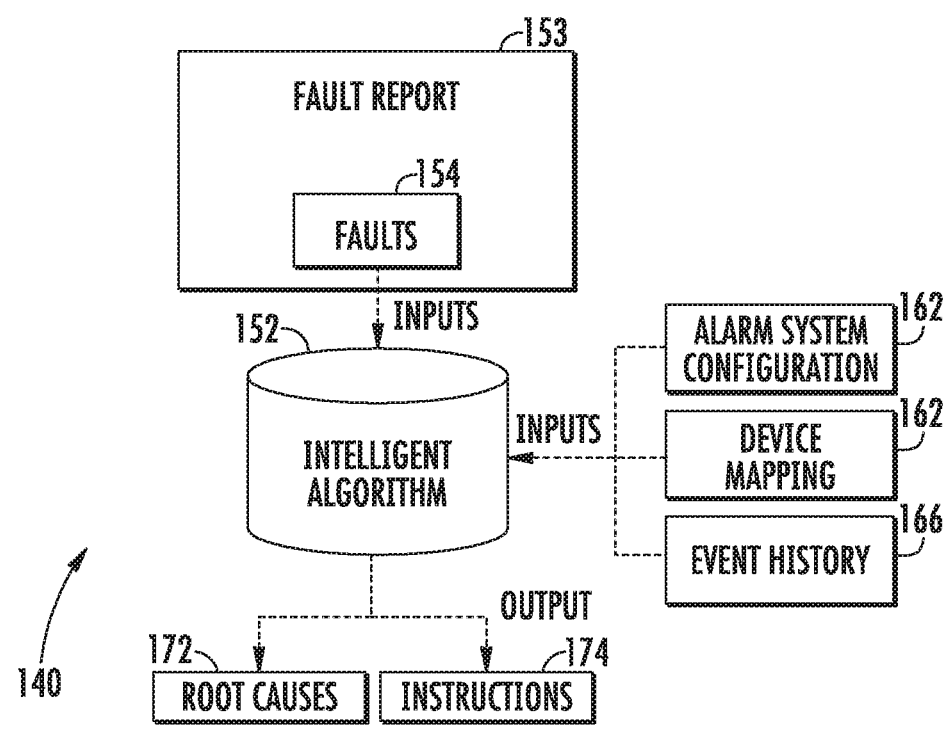
FIG. 2 is a block diagram of a computer program product, showing inputs and outputs of the computer program product.

Referring now to FIGS. 1 and 2, the control for an alarm system, e.g., the alarm system 100, typically includes the ability to report an indication of a condition or "trouble" that might adversely affect the proper operation of the alarm system 100 or a component of the alarm system 100; each report may be termed a "fault" and typically includes a logged event as well as a visible indicator at the control panel 110, and may include a transmission to a monitoring station. In order to ensure adequate protection from the occurrence of adverse events without detection, it is important that alarm system 100 troubles be corrected as soon as possible. During a typical commissioning process multiple faults 154 (i.e., troubles) may arise and each fault 154 needs to be cleared to bring the alarm system 100 to a normal state. In a large alarm system 100 with many devices 120a-120e there may be hundreds of faults 154 generated during the commissioning process.

A fault 154 is an issue, trouble, or problem that may arise during the commissioning process or maintenance period due to various root causes 172. Possible root causes 172 for each fault 154 may be accessible to the intelligent algorithm 152 upon receipt of a fault report 153 including one or more fault 154. Possible root causes 172 for each fault 154 may be stored within the alarm system 100. The possible root causes 172 for each fault may be stored as a look up table. Some root causes 172 may include a faulty device 120a-120e, a faulty connection between devices 120a-120e, etc. Some possible root causes 172 may include but are not limited to: (1) A device 120a-120e may be removed from the SLC 102 loop; (2) an loop line wire of the SLC 102 loop connecting devices 120a-120e may be disconnected; (3) a device 120a-120e hardware failure; (4) a device 120a-120e not properly installed; or (5) an incorrect device 120a-120e setting.

The site engineer 10 must review each fault, understand the fault, analyze the fault, and then fix the fault, which consumes a great deal of time and effort. To fix the fault, the site engineer 10 must analyze the fault on-site, determine a root cause of the fault, determine a solution, attempt the solution, and then try to find another root cause if the solution did not fix the fault. Some faults may be simple and straightforward to understand, some could be complicated and unfamiliar to the site engineer 10. Conventionally, the order in which these faults are fixed and possible root causes remedied to fix them solely depends on the expertise of the site engineer 10. If site engineer 10 is not able to find proper root causes then the site engineer 10 may try to fix the issues by applying wrong procedures which in turn would be a waste the time.

To reduce the time and manpower needed to perform such commissioning, and to standardize the order in which faults are fixed and possible root causes remedied to fix them, in one or more embodiments, the commissioning engine 130 is used to help perform the commissioning process. The commissioning engine 130 includes an intelligent algorithm 152, e.g., a computer program product tangibly embodied on the memory 138, installed on the control panel 110 of the alarm system 100 or a separate hardware system capable of communicating with the control panel 110 and the intelligent algorithm 152 may installed on the separate hardware system. The separate hardware system may be a mobile computing device such as, for example, a laptop, a smartphone, a smart watch, etc. The intelligent algorithm 152 is configured to aid the site engineer 10 in the commissioning process, as shown in method 200 below, by analyzing the faults 154 in response to the alarm system configuration 162, device mapping 164, and event history 166 in order to determine possible root causes 172 of the faults 154 and providing instructions 174 on how to solve the faults 154. The instructions may be conveyed to the site engineer 10 via the control panel 110 or a mobile computing device (not shown). The instructions may be verbal and/or visual instructions. As shown in FIG. 1, inputs into the intelligent algorithm 152 may include at least one of faults 154, alarm system configuration 162, device mapping 164, and the event history 166. As also shown in FIG. 1, outputs of the intelligent algorithm 152 may include but not limited to root causes 172 and instructions 174.

The alarm system configuration 162 depicts details regarding the devices 120a-120e including the type of each device 120a-120e (i.e., audible alert device, visual alert device, detector, and alarm activation device), settings of each device 120a-120e, and a location of each device 120a-120e. The alarm system configuration 162 may be manually and/or automatically input into the alarm system 100 by the engineer installing the alarm system 100. To configure the alarm system configuration 162 manually, the installer/engineer can configure it directly through a user interface of the control panel 110 (e.g., using a display and keypad of the control panel 110) or the installer/engineer can configure the alarm system configuration 162 through a PC based software tool first and then download to the control panel 110. For example, the engineer may manually input the type and location of each device 120a-120e that will be installed in the alarm system 100 and then the alarm system 100 may automatically pull settings of each devices 120a-120e from a remote database. In another example, the type, settings, and location of each device 120a-120e may be automatically loaded onto the alarm system 100 via an electronic engineering design (e.g., CAD layout, site floor plan). The device mapping 164 depicts how the devices 120a-120e are coupled or connected to each other and to the control panel 110. The event history 166 depicts every event that has happened to the control panel 110 (e.g., an alarm event or a fault 154 event), a time stamp of each event, and a type of event. An Installer/User can access the event history 166 if they want to know what events have happened in the control panel 110 and when it happened. During initial commissioning when the control panel 110 is switched ON for the first time after delivery from the factory it will have no event history (i.e., the event history 166 will be empty) but as its starts communicating with the devices 120a-120e and other modules it will start progressively building up the event history 166.

Figure 3:
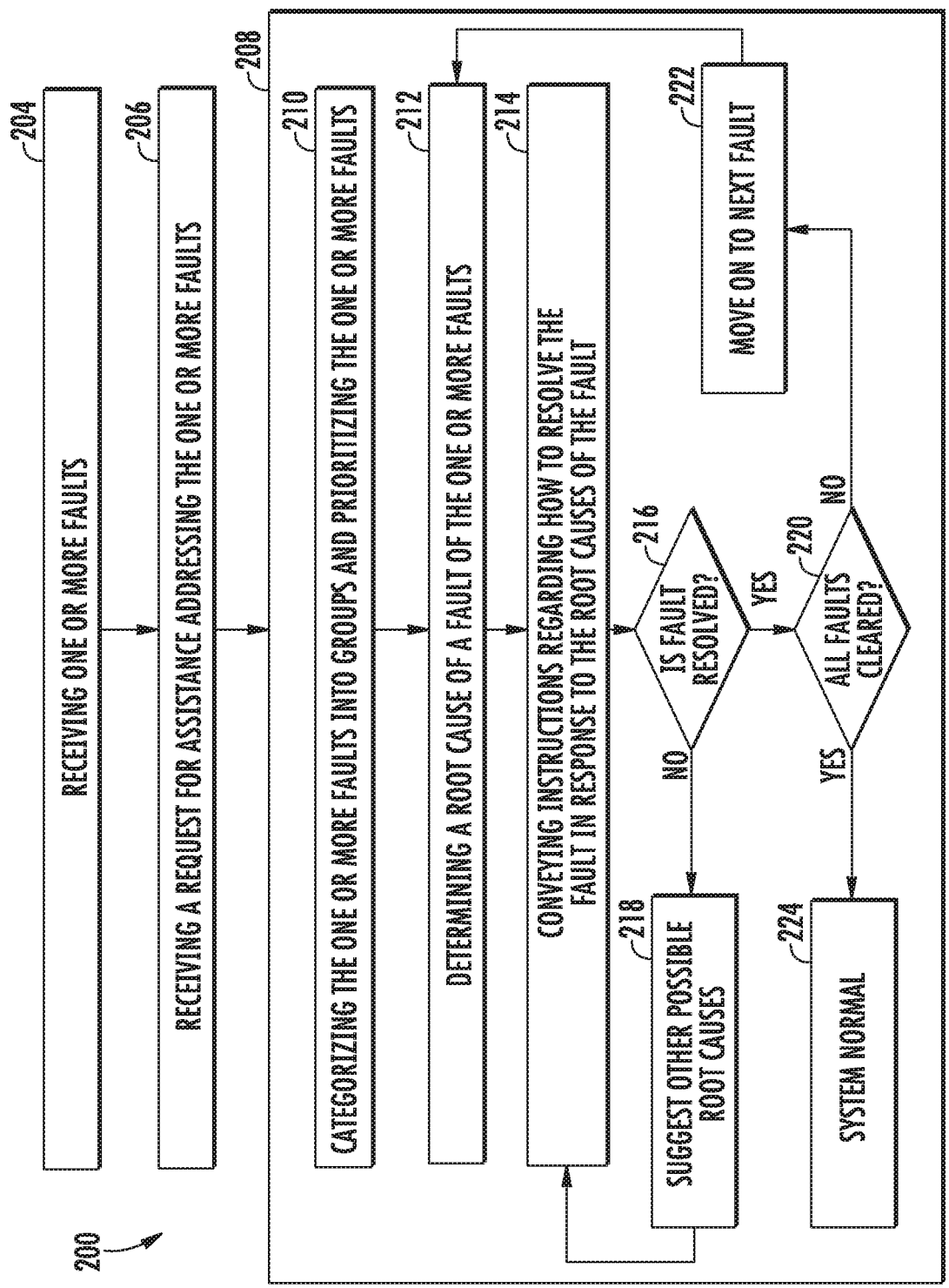
FIG. 3 is a flow diagram illustrating a method of commissioning the alarm system of FIG. 1, according to an embodiment of the present disclosure.

Referring now to FIG. 3, and with continued reference to FIGS. 1 and 2, a flow chart of method 200 of commissioning or maintenance of an alarm system 100 is shown. At block 204, the fault report 153 including one or more faults 154 are received. In certain embodiments the one or more faults 154 are provided to the intelligent algorithm 152 by the commissioning engine 150. In accordance with certain embodiments, the one or more faults 154 are provided to the intelligent algorithm 152 by the control panel 110. Receipt of the faults 154 can be automatic, i.e., without the intervention of a user.

At block 206, a request for assistance addressing the one or more faults 154 is received by the intelligent algorithm 152. The request for assistance can be received from the control panel 110. In certain embodiments the request for assistance is received from the commissioning engine 130. In accordance with certain embodiments the request for assistance can be received from a site engineer 10 via the user interface 136. In some embodiments block 206 may be omitted as the control panel 110 may automatically analyze the one or more faults 154 when received.

At block 208, the intelligent algorithm 152 provides instructions 174 to guide the engineer through solving the one or more faults 154 that have arisen. It is contemplated that the instructions 174 be provided by the intelligent algorithm to the site engineer 10 via the control panel 110. In certain embodiments the instruction 174 can be provided to the site engineer 10 via the commissioning engine 130. In accordance with certain embodiments the instructions can be provided to the site engineer 10 via the user interface 136. The site engineer 10 will then physically check to alarm system 100 in accordance with the instructions 174. The intelligent algorithm 152 may automatically check whether the faults 154 have been cleared or wait for an input from the site engineer 10 that the instructions 174 have been completed and then check whether the faults 154 have been cleared.

At block 210, the faults 154 are categorized into groups and prioritized into a particular order to determine what faults 154 should be resolved first. It is contemplated that the categorization and prioritization of the faults 154 be done by the control panel 110. In certain embodiments the categorization and prioritization of the faults 154 be done by the commissioning engine 130. Some faults 154 may be given higher priority as fixing the higher priority faults may also fix the lower priority faults. The categories of the faults 154 include but are not limited to: device 120a-120e related faults (e.g., no response from the device 120a-120e, end of line (EOL) fault, power supply of device 120a-120e is not connected, etc.); cabinet related faults (e.g., loop card/CPU module/power Supply/Digital Alarm Communicator Transmitter (DACT), etc.); power supply related faults (e.g., battery fault, AC fault, etc.); configuration related faults (e.g., incorrect settings of a device 120a-120e); communication related faults (e.g., network communication, telephone, audio, etc.); hardware failure related faults (e.g., CPU failure, RAM faults, etc.); and incorrect wirings faults (e.g., ground faults, short faults, open faults, etc.). It is understood that the categories of the faults 154 are utilized for exemplary purposed and there may be additional and/or different categories of faults 154.

Each fault 154 may be prioritized based upon various criteria including but not limited to: life safety criticality (e.g., detector communication failure); impact on other faults 154 (e.g., an incompatible firmware version could cause multiple other faults); multiple faults of same type due to single root cause (e.g., a SLC 102 cable disconnection can cause multiple device 120a-120e communication failure faults 154); and faults 154 impacting regulatory compliances (e.g., NFPA 72, UL 864 and EN 54).

At block 212, a root cause 172 is determined for a fault 154 of the one or more faults 154. It is contemplated that the root cause 172 be determined by the control panel 110. In certain embodiments the root cause 172 can be determined by the commissioning engine 130. The fault 154 may be the fault 154 of highest priority on the list of faults created at block 210.

At block 214, the alarm system 100 conveys instructions 174 to a site engineer 10 regarding how to resolve each of the one or more faults 154 in response to the root cause 172. The instructions 174 can be conveyed from the control panel 110 to the site engineer 10. In certain embodiments the instructions 174 are conveyed from the commissioning engine 130 to the site engineer 10. In accordance with certain embodiments the instructions 174 are conveyed to the site engineer 10 by the user interface 136. The site engineer 10 then carries out the instructions 174 to solve each fault 154 in the order determined. The site engineer 10 will then physically check to alarm system 100 in accordance with the instructions 174. The intelligent algorithm 152 may automatically check whether the faults 154 have been cleared or wait for an input from the site engineer 10, e.g., through the user interface 136, that the instructions 174 have been completed, and the intelligent algorithm 152 thereafter check whether the action taken by the site engineer 10 responsive the instructions 174 resolved the fault 154.

At block 216, if the fault 154 is resolved then the method 200 checks to see if all faults are cleared at block 220. If the instruction 174 carried out by the site engineer 10 has resolved the fault 154 then the method 200 automatically processes the next fault 154. In this case no input is required from the site engineer 10 with respect to already resolved fault 154. However, if the instruction 174 carried out by the site engineer 10 has failed to resolve the fault 154 (that is fault 154 still exists), then site engineer 10 can provide an input to the alarm system 100, e.g., via the user interface 136, that the site engineer 10 has carried out the instructions 174, see block 216 below. The intelligent algorithm 152 can then suggest new instructions 174 based on the other most probable root causes 172 (e.g., this is applicable when there might be multiple root causes 172 for a single fault 154), see block 216.

At block 216, if the fault 154 is not resolved then the method 200 determines and suggest possible other root causes 172 to explain the fault 154 at block 218, using the intelligent algorithm 152 and then moves back to block 214 to provide additional instructions on how to address the other possible root causes 172. It is contemplated that the additional instructions can be provided to the site engineer 10 by the control panel 110. In certain embodiments the additional instructions can be provided to the site engineer 10 by the commissioning engine 130. In accordance with certain embodiments the additional instructions can be provided to the site engineer 10 via the user interface 136.

At block 220, if all faults 154 are cleared the alarm system 100 is determined to be operating normally at block 224. At block 220, if all faults are not cleared, the method moves back to block 212 to determine the root cause of the next fault 154 at block 222 and proposes further instructions at block 214. It is contemplated that these further instructions be selected by the intelligent algorithm 152. The further instructions can be communicated to the site engineer 10 by the control panel 110. In certain embodiments the further instructions are communicated to the site engineer 10 by the commissioning engine 130. In accordance with certain embodiments the further instructions can be communicated to the site engineer 10 via the user interface 136.

While the above description has described the flow process of FIG. 2 in a particular order, it should be appreciated that unless otherwise specifically required in the attached claims that the ordering of the steps may be varied.

Figure 4:
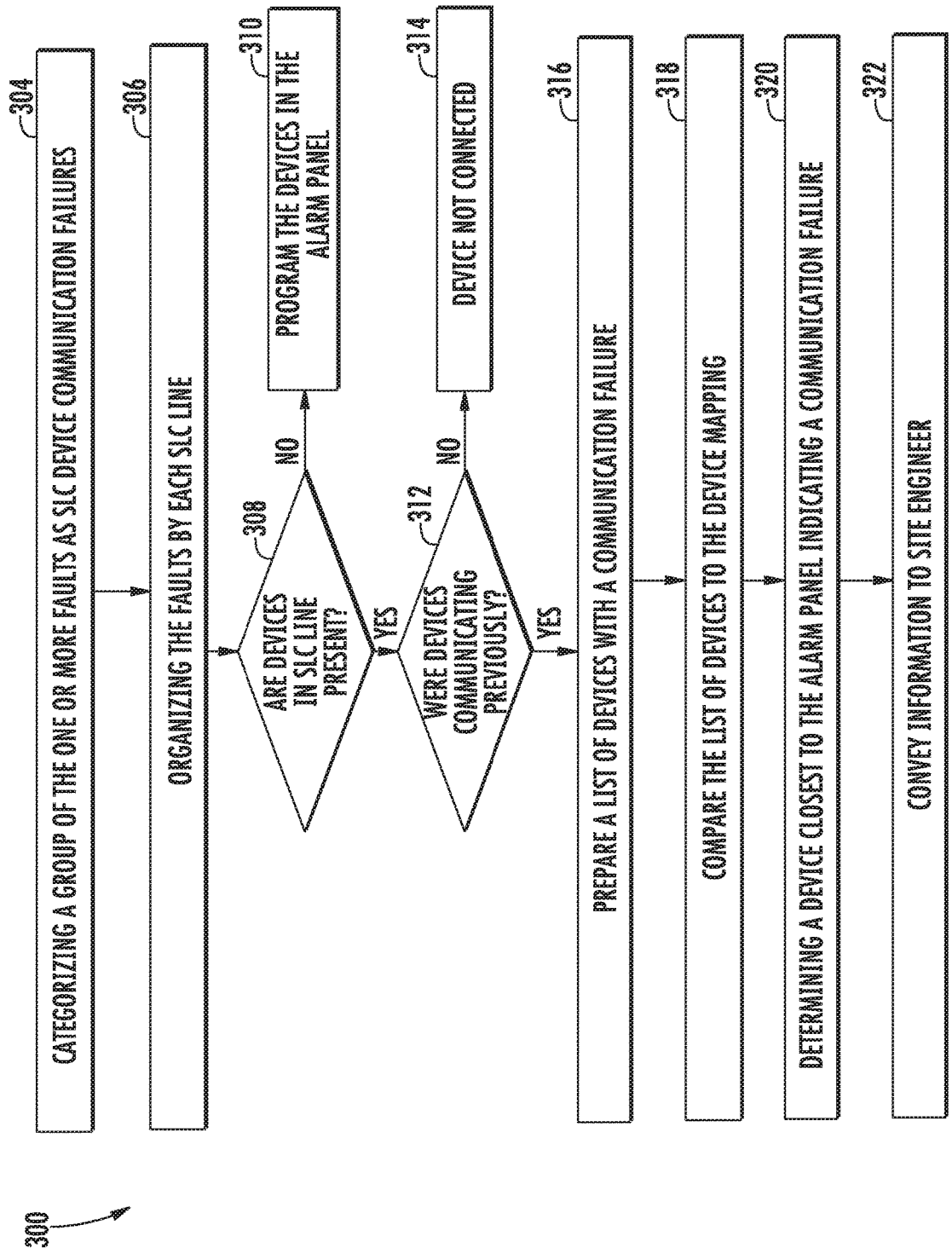
FIG. 4 is a flow diagram illustrating a method of commissioning the alarm system of FIG. 1, according to an embodiment of the present disclosure.

Referring now to FIG. 4, and with continued reference to FIGS. 1 and 2, a flow chart of method 300 of commissioning an alarm system 100 when the fault 154 is categorized as a device 120a-120e communication failure is shown. In one example, method 300 may initiate at block 210 of method 200 of FIG. 3. At block 304, the method 300 begins with categorizing a group of the one or more faults as SLC device communications failures, meaning that the devices 120a-120e are not able to communicate with the control panel 110. It is contemplated that the categorization be performed by the intelligent algorithm 152. In certain embodiments the categorization can be performed by the commissioning engine 130. In accordance with certain embodiment the categorization can be performed by the control panel 110.

At block 306, the faults 154 are organized (i.e., grouped) by SLCs 102 line such that each SLC 102 line is examined individually. It is contemplated that the faults 154 can be organized by the intelligent algorithm 152. In certain embodiments the faults 154 be organized by the commissioning engine 130. In accordance with certain embodiment the faults 154 can be organized by the control panel 110.

At block 308, it is checked whether all the devices 120a-120e in the SLC 102 line are present in the alarm system configuration 162. If all devices 120a-120e are not present in the alarm system configuration 162, then that may be causing the communication failure and the method 300 moves to block 310 where the site engineer 10 is instructed to program the devices 120a-120e into the control panel 110 that are not present in the alarm system configuration 162. If all devices 120a-120e are present in the alarm system configuration 162, then the method 300 moves to block 312. It is contemplated that the devices 120a-120e can be checked by the intelligent algorithm 152. In certain embodiments the devices 120a-120e can be checked by the commissioning engine 130. In accordance with certain embodiments the devices 120a-120e can be checked by the control panel 110.

At block 312, it is checked whether the devices 120a-120e in the SLC 102 line were communicating previously based upon event history 166 of the control panel 110. If a device 120a-120e in the SLC 102 line was not communicating previously then the device 120a-120e may not be connected, thus the site engineer 10 is instructed to check the connection of this device 120a-120e at block 314. If all the devices 120a-120e in the SLC 102 line were communicating previously then the method 300 moves to block 316. It is contemplated that the devices 120a-120e can be checked by the intelligent algorithm 152. In certain embodiments the devices 120a-120e can be checked by the commissioning engine 130. In accordance with certain embodiments the devices 120a-120e can be checked by the control panel 110.

At block 316, a list of devices 120a-120e experiencing a communication failure is prepared and at block 318 that list is compared to the device mapping 164 of the alarm system 100 in order to determine in what order the communication failures are occurring along the SLC 102 line. It is contemplated that the determination of the order of communication failure along the SLC 102 line can be made by the intelligent algorithm 152. In certain embodiments the determination of the order of communication failure along the SLC 102 line can be made by the commissioning engine 130. In accordance with certain embodiments the determination of the order of communication failure along the SLC 102 line can be made by the control panel 110.

At block 320, a device 120a-120e experiencing a communication failure closest to the control panel 110 is determined. Since the devices 120a-120e are connected in series to the control panel 110 along the SLC 102 line a fault 154 with one device 120a-120e will cause a fault 154 for the rest of the device 120a-120e coming after the device 120a-120e along the SLC 102 line moving away from control panel 110. It is contemplated that the determination of the device 120a-120e experiencing the communication failure be made by the intelligent algorithm 152. In certain embodiments the determination of the device 120a-120e experiencing the communication failure can be made by the commissioning engine 130. In accordance with certain embodiments the determination of the device 120a-120e experiencing the communication failure can be made by the control panel 110.

At block 322, the device 120a-120e experiencing a communication failure closest to the control panel 110 is conveyed to the site engineer 10, so that the site engineer 10 may check that device 120a-120e first. It is contemplated that the device 120a-120e closest to the control panel 110 experiencing the communication failure can be communicated to the site engineer 10 by the control panel 110. In certain embodiments the device 120a-120e closest to the control panel 110 experiencing the communication failure can be communicated to the site engineer 10 by the commissioning engine 130. In accordance with certain embodiments the device 120a-120e closest to the control panel 110 experiencing the communication failure can be communicated to the site engineer 10 via the user interface 136.

While the above description has described the flow process of FIG. 4 in a particular order, it should be appreciated that unless otherwise specifically required in the attached claims that the ordering of the steps may be varied.

It is also understood that method 300 illustrated by FIG. 4 is a sample illustration of a "device communication failure" fault 154 and similar methods can be applied for other types of faults 154 as well in determining the possible root causes 172 of each fault 154.

As described above, embodiments, such as the intelligent algorithm 152, can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of commissioning or maintenance an alarm system, the method comprising:
   accessing an alarm system including a plurality of alarm devices connected to a control panel by a signaling line circuit;
   receiving a fault report comprising one or more faults from the alarm system;
   categorizing the one or more faults;
   prioritizing the one or more faults into a list of highest priority based on criteria comprising life safety criticality, impact on other faults, multiple faults of same type due to a single root cause and faults impacting regulatory compliances;
   determining a first root cause of a first fault of the one or more faults in response to at least one of an alarm system configuration of the alarm system, a device mapping of the alarm system, and an event history of the alarm system;
   providing instructions, via a user interface, regarding how to resolve the first fault in response to the first root cause; and
   detecting whether the first fault is resolved.

2. The method of claim 1, further comprising:
   determining a second root cause of the first fault of the one or more faults in response to at least one of an alarm system configuration of the alarm system, a device mapping of the alarm system, and an event history of the alarm system, when the first fault is not resolved;
providing instructions regarding how to resolve the first fault in response to the second root cause; and
detecting whether the first fault is resolved.

3. The method of claim 1, further comprising:
determining that the first fault is resolved;
determining that a second fault of the one or more faults is unresolved;
determining a first root cause of the second fault of the one or more faults in response to at least one of an alarm system configuration of the alarm system, a device mapping of the alarm system, and an event history of the alarm system;
providing instructions regarding how to resolve the second fault in response to the first root cause of the second fault; and
detecting whether the second fault is resolved.

4. The method of claim 3, wherein the first fault is prioritized higher than the second fault.

5. The method of claim 3, further comprising:
determining a second root cause of the second fault of the one or more faults in response to at least one of an alarm system configuration of the alarm system, a device mapping of the alarm system, and an event history of the alarm system, when the second fault is not resolved;
providing instructions regarding how to resolve the second fault in response to the second root cause; and
detecting whether the second fault is resolved.

6. The method of claim 1, wherein the instructions are provided through at least one of a control panel of the alarm system and a mobile computing device in communication with the control panel.

7. A method of commissioning an alarm system, the method comprising:
accessing an alarm system including a plurality of alarm devices connected to a control panel by a signaling line circuit;
receiving a fault report comprising one or more faults from the alarm system;
categorizing the one or more faults into groups including a device communication failure group, wherein each of the one or more faults in the device communication failure group is a device communication failure fault;
organizing the one or more faults in the device communication failure group into one or more signaling line circuits of the alarm system, the one or more signaling line circuits including a first signaling line circuit; and
providing instructions, via a user interface, regarding how to resolve the one or more faults along the first signaling line circuit in the device communication failure group;
wherein providing instructions further comprises:
determining a list of all devices in the first signaling line circuit having a fault indicating a communication failure;
comparing a device mapping of the alarm system to the list of all devices in the first signaling line circuit having a fault indicating a communication failure;
determining a device closest to the control panel indicating a communication failure; and
conveying that the device closest to the control panel is indicating a communication failure and should be checked first.

8. The method of claim 7, wherein providing instructions further comprises:
determining whether each device in the first signaling line circuit is present in an alarm system configuration of the alarm system; and
conveying that a device in the first signaling line circuit should be added to the alarm system configuration of the alarm system if determined to not be present.

9. The method of claim 7, wherein providing instructions further comprises:
determining whether each device in the first signaling line circuit has communicated with a control panel of the alarm system previously based upon an event history of the control panel; and
conveying that a device in the first signaling line circuit should be connected to the control panel if determined to have not communicated with the control panel.

10. The method of claim 8, wherein providing instructions further comprises:
determining whether each device in the first signaling line circuit has communicated with a control panel of the alarm system previously based upon an event history of the control panel; and
conveying that a device in the first signaling line circuit should be connected to the control panel if determined to have not communicated with the control panel.

11. The method of claim 10, wherein providing instructions further comprises:
determining a list of all devices in the first signaling line circuit having a fault indicating a communication failure;
comparing a device mapping of the alarm system to the list of all devices in the first signaling line circuit having a fault indicating a communication failure;
determining a device closest to the control panel indicating a communication failure; and
conveying that the device closest to the control panel is indicating a communication failure and should be checked first.

12. The method of claim 7, wherein the instructions are provided through at least one of a control panel of the alarm system and a mobile computing device in communication with the control panel.

13. A computer program product tangibly embodied on a computer readable medium, the computer program product including instructions that, when executed by a processor, cause the processor to perform operations comprising:
accessing an alarm system including a plurality of alarm devices connected to a control panel by a signaling line circuit;
receiving a fault report comprising one or more faults from an alarm system;
categorizing the one or more faults;
prioritizing the one or more faults into a list of highest priority;
determining a first root cause of a first fault of the one or more faults in response to at least one of an alarm system configuration of the alarm system, a device mapping of the alarm system, and an event history of the alarm system;
providing instructions, via a user interface, regarding how to resolve the first fault in response to the first root cause; and
detecting whether the first fault is resolved;
wherein providing instructions further comprises:

determining a list of all devices in the first signaling line circuit having a fault indicating a communication failure;

comparing a device mapping of the alarm system to the list of all devices in the first signaling line circuit having a fault indicating a communication failure;

determining a device closest to the control panel indicating a communication failure; and conveying that the device closest to the control panel is indicating a communication failure and should be checked first.

14. The computer program product of claim 13, wherein the operations further comprise:

determining a second root cause of the first fault of the one or more faults in response to at least one of an alarm system configuration of the alarm system, a device mapping of the alarm system, and an event history of the alarm system, when the first fault is not resolved;

providing instructions regarding how to resolve the first fault in response to the second root cause; and detecting whether the first fault is resolved.

15. The computer program product of claim 13, wherein the operations further comprise:

determining that the first fault is resolved;

determining that a second fault of the one or more faults is unresolved;

determining a first root cause of the second fault of the one or more faults in response to at least one of an alarm system configuration of the alarm system, a device mapping of the alarm system, and an event history of the alarm system;

providing instructions regarding how to resolve the second fault in response to the first root cause of the second fault; and detecting whether the second fault is resolved.

16. The computer program product of claim 15, wherein the first fault is prioritized higher than the second fault.

17. The computer program product of claim 15, wherein the operations further comprise:

determining a second root cause of the second fault of the one or more faults in response to at least one of an alarm system configuration of the alarm system, a device mapping of the alarm system, and an event history of the alarm system, when the second fault is not resolved;

providing instructions regarding how to resolve the second fault in response to the second root cause; and detecting whether the second fault is resolved.

18. The computer program product of claim 13, wherein the instructions are provided through at least one of a control panel of the alarm system and a mobile computing device in communication with the control panel.

* * * * *